US007827801B2

(12) United States Patent
Dawson et al.

(10) Patent No.: US 7,827,801 B2
(45) Date of Patent: Nov. 9, 2010

(54) GAS TURBINE ENGINE TRANSITIONS COMPRISING CLOSED COOLED TRANSITION COOLING CHANNELS

(75) Inventors: Robert W. Dawson, Oviedo, FL (US); Robert J. Bland, Oviedo, FL (US); Bradley T. Youngblood, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 1286 days.

(21) Appl. No.: 11/350,562

(22) Filed: Feb. 9, 2006

(65) Prior Publication Data

US 2007/0180827 A1 Aug. 9, 2007

(51) Int. Cl.
*F02C 1/00* (2006.01)

(52) U.S. Cl. .......................................... 60/759; 60/752

(58) Field of Classification Search ........... 60/752–760, 60/770

See application file for complete search history.

(56) References Cited

U.S. PATENT DOCUMENTS

| | | | | |
|---|---|---|---|---|
| 3,064,425 | A | 11/1962 | Hayes | |
| 3,652,181 | A | 3/1972 | Wilhelm, Jr. | |
| 4,339,925 | A | 7/1982 | Eggmann et al. | |
| 4,719,748 | A | 1/1988 | Davis, Jr. et al. | |
| 4,872,312 | A * | 10/1989 | Iizuka et al. | 60/760 |
| 4,903,477 | A | 2/1990 | Butt | |
| 5,490,388 | A | 2/1996 | Althaus et al. | |
| 5,581,994 | A | 12/1996 | Reiss et al. | |
| 5,906,093 | A | 5/1999 | Coslow et al. | |
| 6,000,908 | A * | 12/1999 | Bunker | 416/95 |
| 6,018,950 | A | 2/2000 | Moeller | |
| 6,116,013 | A | 9/2000 | Moeller | |
| 6,282,905 | B1 * | 9/2001 | Sato et al. | 60/752 |
| 6,412,268 | B1 | 7/2002 | Cromer et al. | |
| 6,463,742 | B2 | 10/2002 | Mandai et al. | |
| 6,484,505 | B1 | 11/2002 | Brown et al. | |
| 6,494,044 | B1 * | 12/2002 | Bland | 60/772 |
| 6,536,201 | B2 | 3/2003 | Stuttaford et al. | |
| 6,568,187 | B1 | 5/2003 | Jorgensen et al. | |
| 6,602,053 | B2 | 8/2003 | Subramanian et al. | |
| 6,615,588 | B2 | 9/2003 | Hoecker | |
| 6,640,547 | B2 | 11/2003 | Leahy, Jr. | |
| 6,662,568 | B2 | 12/2003 | Shimizu et al. | |
| 6,684,620 | B2 | 2/2004 | Tiemann | |
| 6,890,148 | B2 * | 5/2005 | Nordlund | 415/115 |

(Continued)

*Primary Examiner*—William H Rodríguez
*Assistant Examiner*—Gerald L Sung

(57) ABSTRACT

A transition (200) for a gas turbine engine (100) comprises a transition wall (201) comprising cooling channels (213L, 213R, 223L, 223R) that are adapted to pass a cooling fluid, such as compressed air from a compressor (102) during operation of the gas turbine engine (100) so as to cool combusted hot gases passing through the transition (200). For each cooling channel (213L, 213R, 223L, 223R), respective entry ports (212L, 212L, 222L, 222R) and exit ports (214L, 214R, 224L, 224R) are arranged so as to obtain a performance improvement based upon pressure differentials between the respective entry and exit ports. In various embodiments, a scoop (220) is associated with an entry port (222L, 222R) so as to establish a more elevated pressure differential in the respective cooling channel (223L, 223R). An entry port (330*a-h*) may be positioned offset relative to a lower-positioned exit port (340*a-h*) so as to so minimize or eliminate intake of heated airflow from a respective nearby exit port (340*a-h*). Such offset positioning may be based on the airflow paths and cooling requirements at selected high-temperature operating conditions.

8 Claims, 5 Drawing Sheets

U.S. PATENT DOCUMENTS

| | | | | |
|---|---|---|---|---|
| 7,310,938 | B2 * | 12/2007 | Marcum et al. | 60/39.37 |
| 2001/0004835 | A1 | 6/2001 | Alkabie et al. | |
| 2002/0189260 | A1 | 12/2002 | David et al. | |
| 2003/0167776 | A1 | 9/2003 | Coppola | |
| 2004/0118123 | A1 * | 6/2004 | Tiemann | 60/752 |
| 2009/0145099 | A1 * | 6/2009 | Jennings et al. | 60/39.37 |
| 2009/0249791 | A1 * | 10/2009 | Belsom | 60/755 |

* cited by examiner

GAS TURBINE ENGINE TRANSITIONS COMPRISING CLOSED COOLED TRANSITION COOLING CHANNELS

FIELD OF THE INVENTION

The invention generally relates to a gas turbine engine that comprises a transition duct that is cooled with air from a compressor. More particularly, it relates to transitions comprising cooling channels in which those channels benefit in operational efficiency by pressure differences at the respective entry and exit ports of the cooling channels.

BACKGROUND OF THE INVENTION

Gas turbine engines comprise a compressor section, a combustor section and a turbine section. Each of these sections comprises an inlet end and an outlet end, and intervening components may connect these sections. A combustor transition member, commonly referred to as a transition (and also referred to as a "transition duct" or "tail pipe" by some in the art) is mechanically coupled between the combustor section outlet end and the turbine section inlet end to direct a working gas from the combustor section into the turbine section. Conventional transitions may be of the solid wall type or interior cooling channel wall type, and the type with interior cooling channels includes those in which cooling air passes from the exterior to the interior (open-type cooling) and those in which cooling air does not enter the transition interior (closed-type cooling).

The working gas is produced by combusting an air/fuel mixture. A supply of compressed air, originating from the compressor section, is mixed with a fuel supply to create a combustible air/fuel mixture. The air/fuel mixture is combusted in the combustor to produce the high temperature and high pressure working gas. The working gas is ejected into the combustor transition member to change the working gas flow exiting the combustor from a generally cylindrical flow to a generally annular flow which is, in turn, directed into the first stage of the turbine section.

As those skilled in the art are aware, the maximum power output of a gas turbine is achieved by heating the gas flowing through the combustion section to as high a temperature as is feasible. The hot working gas, however, may produce combustor section, transition, and turbine section component metal temperatures that exceed the maximum operating rating of the alloys from which the combustor section and turbine section are made. This, in turn, may induce premature stress and cracking along various components, such as a transition. Additionally, it is appreciated that a balancing of performance and emissions is required under current environmental regulations. As to that balancing, any developments that improve both overall operational performance and overall emissions quality at reasonable cost would represent an advance in the art.

Generally, transition cooling may be effectuated fully or partially by any of the following known approaches, which represents a non-exclusive list: closed circuit steam cooling (i.e., see for one example U.S. Pat. No. 5,906,093); open cooling (in which a portion of the compressed air passes through channels in the transition and then enters the flow of combusted gases within the transition, see for one example U.S. Pat. No. 3,652,181); convection cooling (see for one example U.S. Pat. No. 4,903,477); effusion cooling (i.e., conveying air from outside the transition through angled holes into the transition); and impingement cooling (where air is directed at the transition exterior walls through apertures positioned on plates or other structures close to these walls, see U.S. Pat. No. 4,719,748 for one example). It also is noted that some of these approaches may be used in combination with one another. For example, one part of a transition may be cooled by impingement cooling, and a second part of the same transition may be cooled by a convection cooling approach.

Notwithstanding the features of current cooling approaches, when compressor air is desired to cool the transition, there is a need for appropriately designed transition cooling that additionally may benefit emissions by replacing open cooling systems. As disclosed in the following sections, the present invention provides a transition with a cooling system that is effective to achieve improved levels of cooling efficiency and may eliminate a need for open cooling systems. That is, the present invention advances the art by solving the potentially conflicting issues of cooling of transitions, conservation of fluid flow to the combustion chambers, and combustion efficiency in the transition.

BRIEF DESCRIPTION OF THE DRAWINGS

The invention is explained in following description in view of the drawings that show.

DETAILED DESCRIPTION OF EMBODIMENTS OF THE INVENTION

Figure 1A:
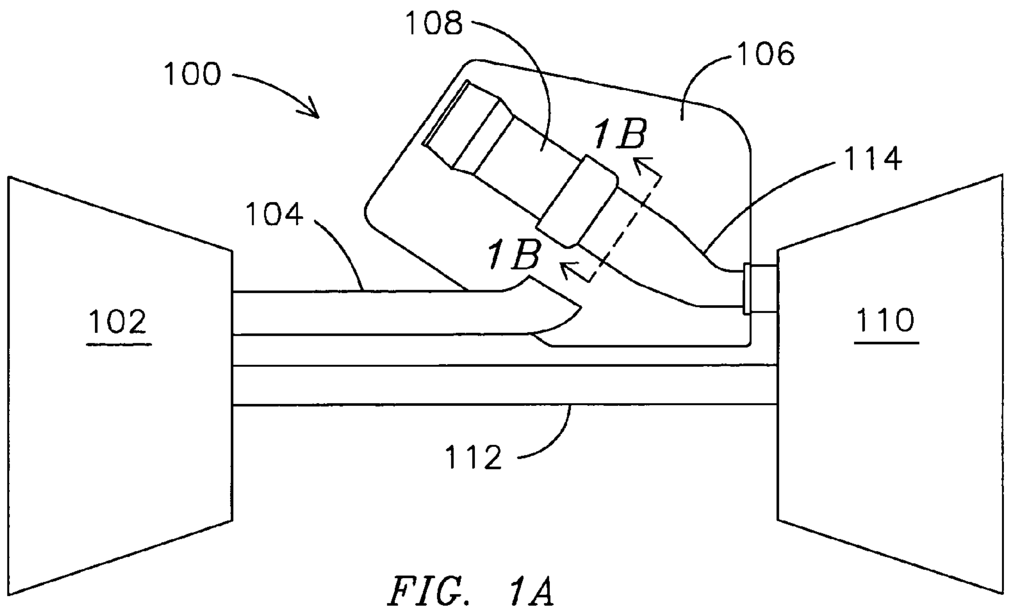
FIG. 1A PRIOR ART
FIG. 1A is a schematic lateral cross-sectional depiction of a prior art gas turbine showing major components.

The present invention addresses the problem of cooling a gas turbine engine transition with an approach that balances operational efficiency and emissions quality. This is achieved by providing cooling channels in the transition that take advantage of the relative pressure differences along the outer surface of the transition, such as between the inboard side and the lateral sides, or between the lateral sides and the outboard side of the transition. Thus, the present invention is directed to transitions that comprise interior cooling channels in their walls for passage of compressed air, as opposed to solid-wall types or steam-cooled types.

Further regarding transitions with cooling channels for passage of a cooling fluid, among the previous approaches are those designed so that compressed air enters such channels from the exterior of the transition, passes through the channels, and then exits the channels into the interior of the transition. This was believed to provide a desired additional cooling effect for the inner surface of the transition, by virtue of establishing a close layer of relatively cooler air that came from the channels, and that cooled the inner surface. However, the present inventors have appreciated the negative impact of this approach as such approach relates to obtaining desirable combustion efficiency and consequent emissions. Particularly, the present inventors have appreciated that concomitant with such cooling of the inner surface of the transition there is a potential loss of combustion efficiency. This is because the decreased inner surface temperature results in decreased percentage of combustion in the transition, resulting in more released carbon monoxide.

Thus, a more desired approach effectively cools the entire transition without overcooling the interior surface with open cooling. Also, when compressed air is not diverted to the interior of the transition through cooling channels, a greater percentage of compressed air from the compressor may enter the combustion chambers' intakes and thereby be utilizable for combustion with fuel as these mix and are combusted. Among other advantages, this helps NOx emissions by lowering the flame temperature.

The present invention provides a channel-based transition cooling system in which the relative positions of specific channel entrances and channel exits provide for cooling fluid flow (through the channels) and consequent increased cooling efficiencies. These are due to relative pressure differences at a respective entry port and a corresponding exit port. Various embodiments of the present invention benefit from local pressure differences in the space, i.e., the plenum, in which a respective transition is located, through which compressed air from the compressor is passing en route to intakes of combustion chambers. The channeled cooling systems of such latter embodiments are 'closed,' i.e., they do not direct air from the channels into the transition interior space (which is referred to functionally as a working gas flow channel).

An example of this is best disclosed by reference to the figures. First, to depict the general art, FIG. 1A provides a generalized lateral cross-sectional depiction of a prior art gas turbine engine 100 comprising a compressor 102, a combustion chamber 108 (such as a can-annular combustion chamber), and a turbine 110 connected by shaft 112 to compressor 102. During operation, in axial flow series, compressor 102 takes in air and provides compressed air to a diffuser 104, which passes the compressed air to a plenum 106 through which the compressed air passes to the combustion chamber 108, which mixes the compressed air with fuel (not shown), providing combusted gases via a transition 114 to the turbine 110, whose rotation may be used to generate electricity.

Figure 1B:
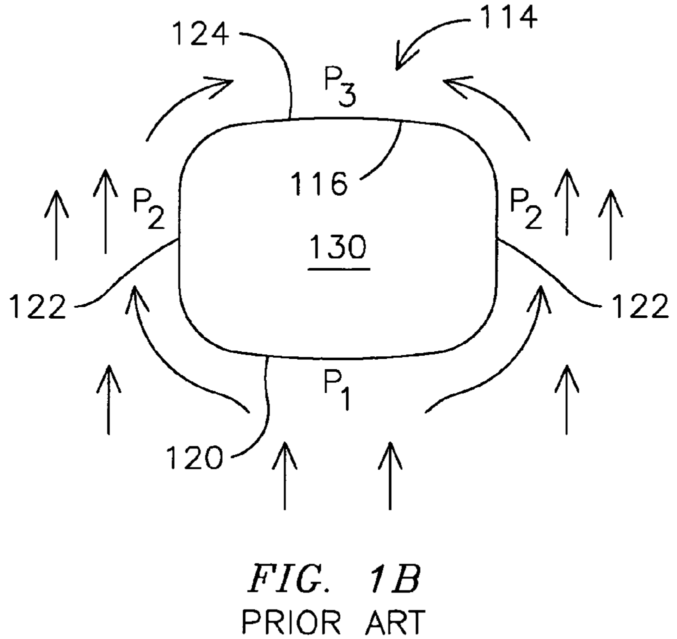
FIG. 1B PRIOR ART
FIG. 1B is a cross-sectional depiction of the transition of FIG. 1A taken along the 1B-1B axis.

FIG. 1B provides a cross-sectional depiction of the transition 114 of FIG. 1A taken along the 1B-1B axis. Transition 114 comprises a sidewall 116 further defined as comprising an inboard side 120, two lateral sides 122, and an outboard side 124. The sidewall 116 defines a working gas flow channel 130 through which combusted and combusting gases pass. Compressed air (direction shown by arrows) flows from the diffuser (not shown in FIG. 1B) upward and around the transition 114, flowing across these surfaces to provide limited convective cooling. Although the design of a diffuser may alter the specific airflow to and along a particular exterior section of the transition 114 when positioned within a gas turbine engine, the total air pressure at $P_1$ along the lower, inboard side 120 generally is higher than the total air pressure at point $P_2$ along the lateral sides 122, which generally is higher than the total air pressure at point $P_3$ along the upper, outboard surface 124. Further, in various embodiments scoops, discussed below, concentrate airflow into associated intake ports along the lateral sides 122, and thereby recover the dynamic head from the flow to generate a higher static pressure at an intake port along lateral sides 122. This is greater than the static pressure at P3, and in such embodiments this concentration of airflow provides a driving force for the flow of cooling fluid in the cooling channels. Also, it is noted that at $P_2$ the dynamic air pressure is relatively high (in part due to constriction of air between adjacent transitions), and is higher than the dynamic air pressure component at point $P_3$. These pressure relationships provide for enhanced performance of embodiments of the present invention.

Figure 2A:
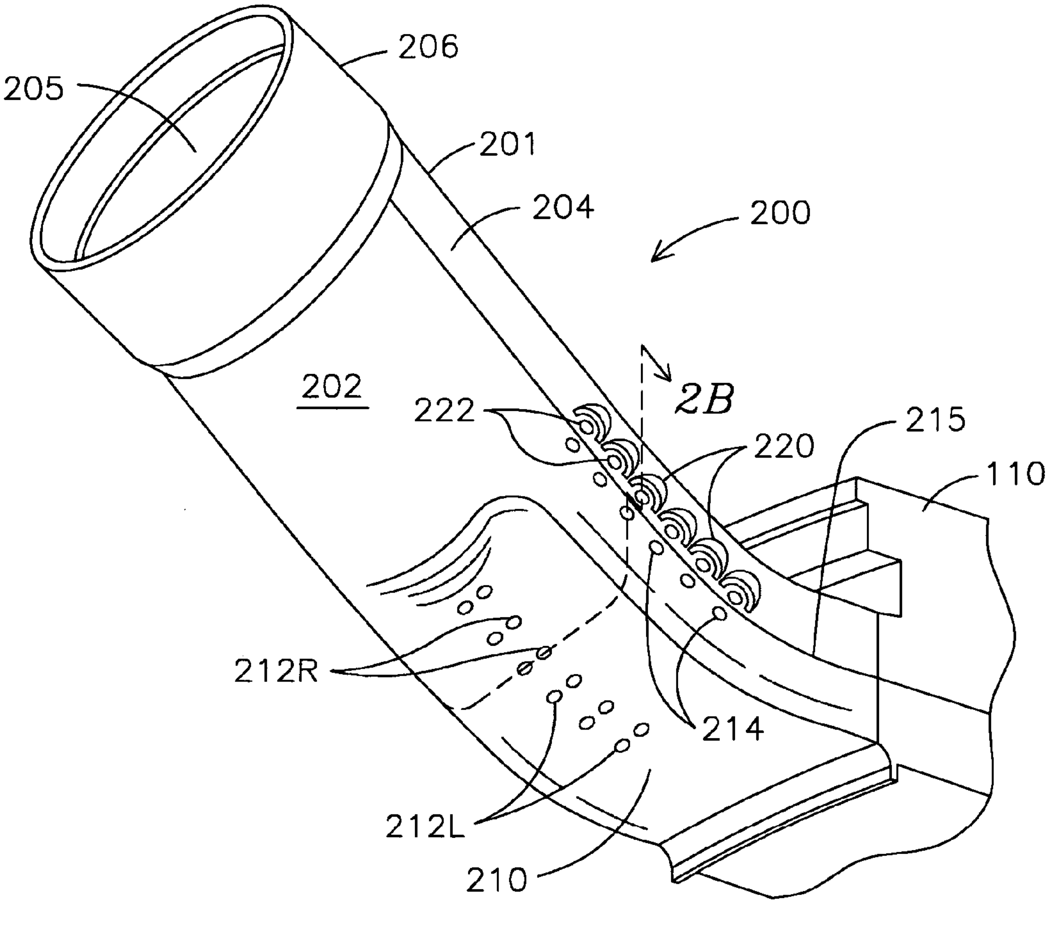
FIG. 2A is a perspective view of a transition from an inboard (underside) position relative to its position in a gas turbine engine.

Various embodiments of the present invention provide for channel cooling that takes advantage of pressure differentials such as those depicted in FIG. 1B. One embodiment of the present invention is shown in FIG. 2A. FIG. 2A provides a perspective view of a transition 200 from an inboard (underside) position, shown abutting a portion of turbine 110. Transition 200 comprises a transition wall 201 comprised of a bottom half 202 and of a top half 204, joined along a lateral midline 215 such as by welding. A working gas flow channel 205 is surrounded by transition wall 201 and by a circumferentially extending transition inlet ring 206, which is a component of transition 200. Along a section of an inboard side 210 of transition wall 201 are disposed a plurality of airflow lower entry ports 212L (for left) and 212R (for right). These lower entry ports 212 are in fluid communication through lower channels (not shown in FIG. 2A, see FIG. 2B) with corresponding lower exit ports, such as lower exit ports 214 in FIG. 2A. Spaced above the midline 215 and between exit ports 214 are disposed a plurality of scoops 220, within which is an airflow upper entry port 222. The upper entry ports 222 positioned within the scoops 220 are in fluid communication through upper channels (not shown in FIG. 2A, see FIG. 2B) with corresponding upper exit ports (not shown in FIG. 2A, see FIG. 2B).

Figure 2B:
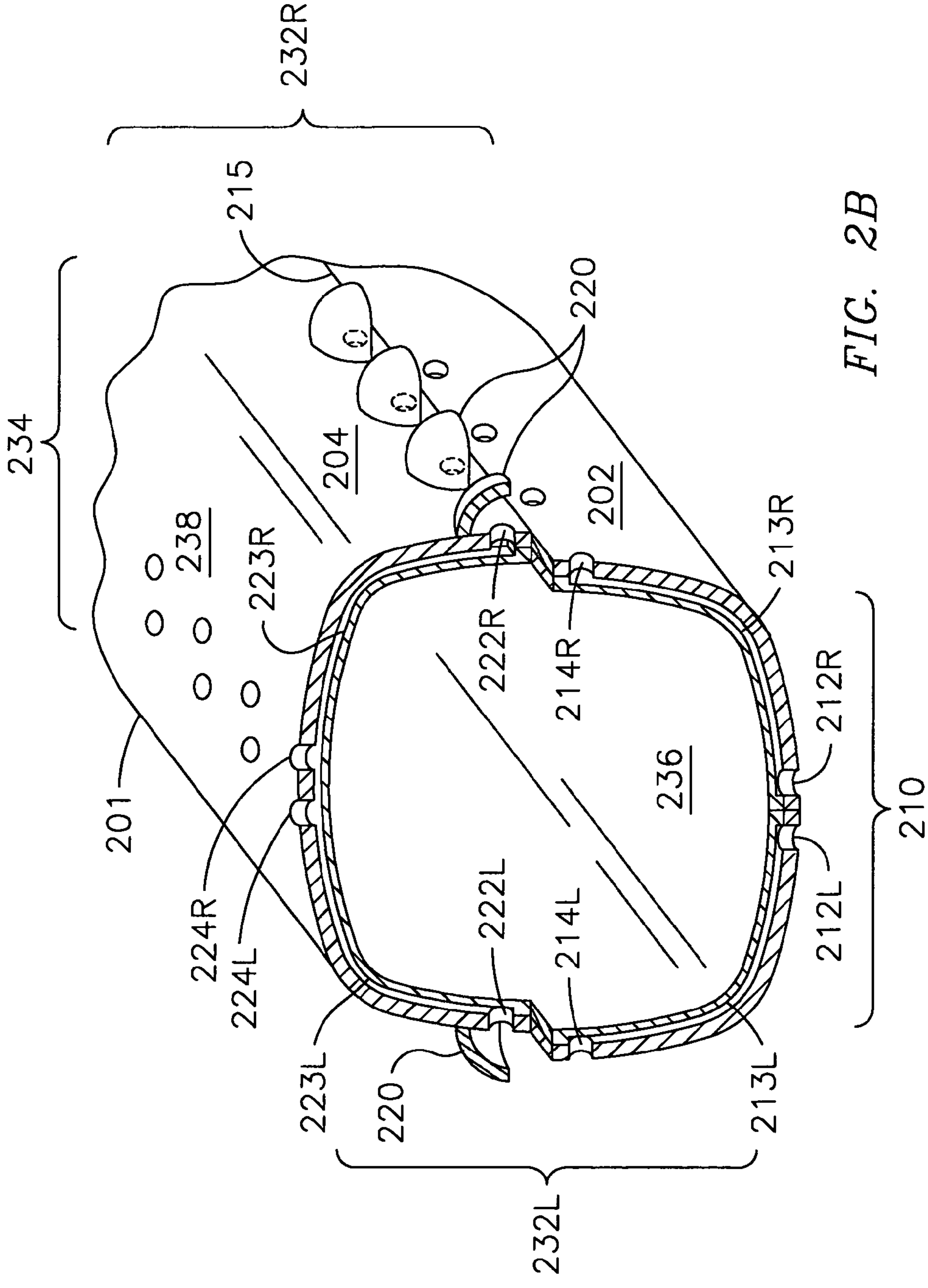
FIG. 2B provides an offset cut-away view of transition of FIG. 2A taken along the dashed lines shown as 2B in FIG. 2A. The cut is partly along a midline seam so as to present differing and offset cooling features of the bottom half and of the top half of the transition.

FIG. 2B provides an offset cut-away view of transition wall 201 of FIG. 2A taken along the dashed lines shown as 2B in the FIG. 2A. More specifically, transition wall 201 is depicted with a cut along the midline 215 so as to present differing and offset cooling features of the bottom half 202 and of the top half 204. Further as to structure identifiable in FIG. 2B, the transition wall 201 comprises the inboard side 210, left and right lateral sides 232L and 232R, and an outboard side 234. Also, the bottom half 202 and the top half 204 each comprise an inner surface 236 and an outer surface 238. The inner surface 236, during operation, is in contact with combustion gases passing through the transition wall 201 to the turbine (not shown), and is in need of cooling.

For providing cooling air through the transition, the following lower and upper channels are provided. A lower channel 213R in the bottom half 202 extends from a lower entry port 212R disposed along the inboard side 210, at a point of relative higher pressure, to a lower exit port 214R disposed along lateral side 232R at a point of relative lower pressure. A similar lower channel 213L extends from an entry port 212L, adjacent entry port 212R, and passes to an exit port 214L disposed along the left lateral side 232L. The same pattern may apply to other channels connecting the lower entry ports and lower exit ports in FIG. 2A, and this is achieved evenly on both lateral sides 232L and 232R.

Thus, a plurality of generally parallel lower channels 213R and 213L are effective to provide closed cooling to a portion of the lower half 202 of transition wall 201 by the passage of air through the channels 213R and 213L. This passage of air is driven by the relative pressure differential between the entry ports 212R and 212L and their respective exit ports 214R and 214L.

Similarly, a plurality of left and right upper channels 223L and 223R provides cooling of a portion of the top half 204. Only one of each side is shown in FIG. 2B, but the same discussion applies to a channel associated with each scoop 220 in FIG. 2A, and to opposing channels and scoops on the hidden side in FIG. 2A. A cooling channel 223L and 223R respectively is associated with a left or a right side upper entry port, 222L or 222R, which as depicted in FIG. 2B is positioned relative to a scoop 220 to concentrate air into the respective port 222L or 222R. Each cooling channel 223L and 223R extends from the respective side entry port 222L or 222R upwardly along the respective lateral side, and then to an upper exit port 224L or 224R disposed along the outboard side 234. The ambient pressure at the exit port 224L or 224R is lower than the pressure at the respective entry port 222L or 222R, and this provides for more effective passage of air through the cooling channels 223L and 223R, and thus provides for more effective overall cooling of the top half 204 of the transition wall 201.

One range of a favorable pressure differential between an entry port 222L or 222R compared to a corresponding exit port 224L or 224R is about one to two percentage of the total pressure increase effectuated by the compressor.

Alternatively, two or more cooling channels may have a common entry port and/or a common exit port, and the positioning of such common ports may be advantageous to obtaining a desired pressure difference and resultant increased flow of cooling fluid (i.e., compressed air) through the cooling channels. For example, instead of having four exit ports 224R on the right side in FIG. 2B, there may be only two such ports 224R, and each of these ports would be in fluid communication with the exit ends (i.e., the ends of the cooling channels meeting the respective exit ports) of two of the cooling channels on the right side. Similarly, a single entry port, such as 212R, may be in fluid communication with intake ends (i.e., the ends of the cooling channels receiving cooling fluid) of two cooling channels (such as 213R). Manifolds are well-known in the art, and manifolds may be employed to interconnect one or more ports (entry or exit) with respective ends of a number of cooling channels.

Figure 3:
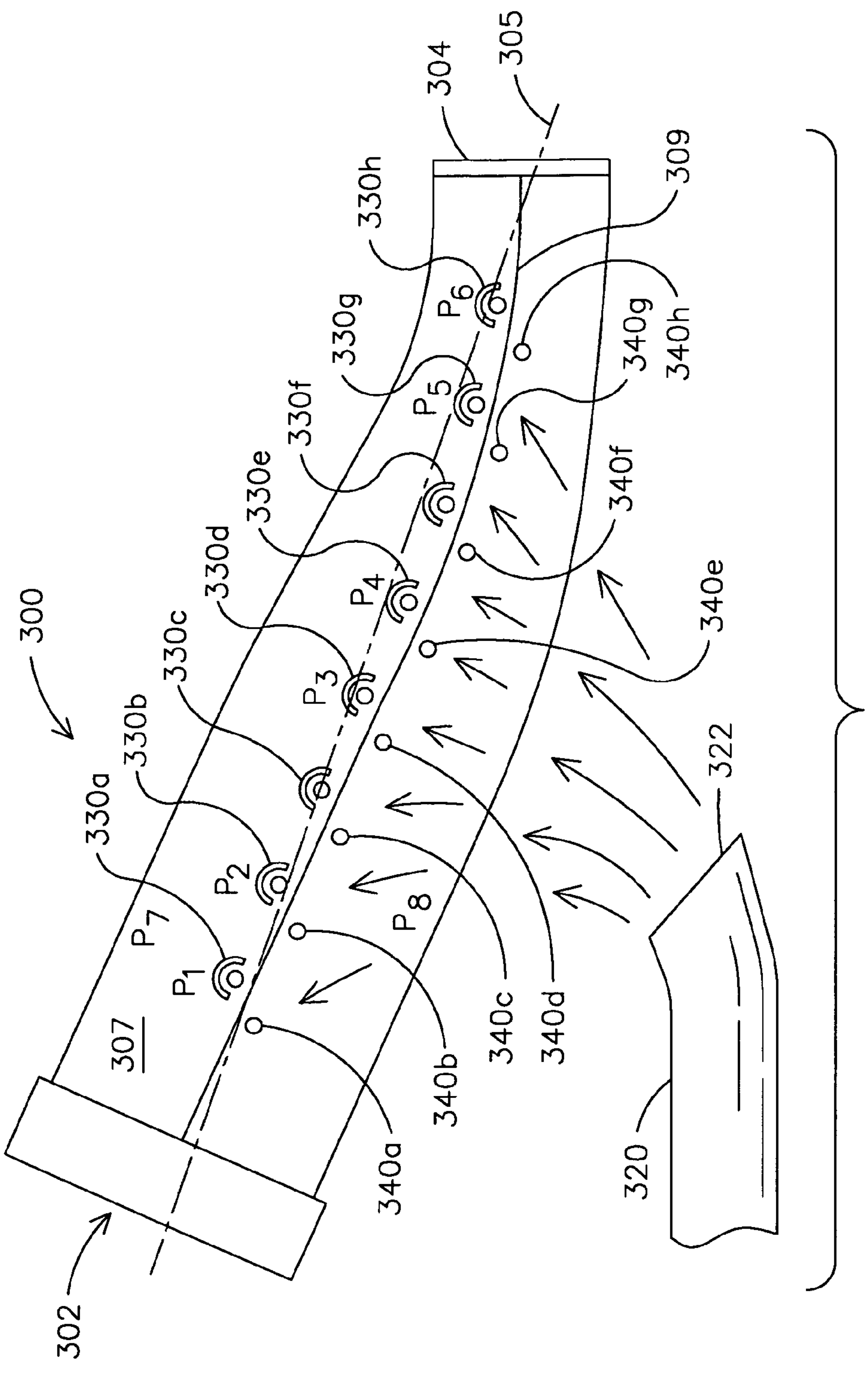
FIG. 3 is a schematic side view of a transition that shows airflow paths during operation. A diffuser also is shown in cross-section side view.

It is readily appreciated that better cooling is achieved in the top half 204 by offsetting the upper entry ports 222L and 222R laterally from the nearby lower exit ports 214L and 214R, so that heated air from the lower exit ports 214L and 214R does not enter any of the upper entry ports 222L and 222R. The desired off-setting of these exit and entrance ports may depend on the overall flow characteristics of the air space (plenum), as lateral air flows, such as from downstream to upstream ends of the transition, may occur. One example of this is depicted in FIG. 3, a schematic side view of a transition 300 having a forward end 302 and an aft end 304, defining a longitudinal axis 305. A lateral side 307 is exposed in the view. While not meant to be limiting, a weld seam 309 is shown effectively bisecting lateral side 307. Also depicted is a diffuser 320 having an outflow end 322. Arrows define flow paths of a cooling fluid, such as compressed air from the diffuser end 320, along the length of transition 300 between the forward end 302 and the aft end 304.

It is appreciated that at points $P_1$, $P_2$, $P_5$, and $P_6$ the angle of the direction of the flow paths are acute relative to the longitudinal axis 305 (and generally to weld seam 309). In contrast, the angle of the direction of the flow paths at points $P_3$ and $P_4$ are substantially perpendicular to that axis 305 and weld seam 309. These local airflow path relationships help determine the appropriate positioning of scoops 330*a-h* and respective corresponding entry ports (not shown) disposed underneath the scoops 330*a-h* relative to exit ports 340*a-h* along the transition 300, so as to minimize or eliminate intake of heated airflow from an exit port 340 into a nearby scoop 330. More generally, this is meant to avoid, or substantially minimize, contamination with an already-heated cooling fluid from an exit port. Based on the angle of the direction of the flow paths, a particular scoop 330*a* may be positioned directly above an exit port 340*a* (with respect to an axis 340 perpendicular to a weld seam 309), yet may receive airflow substantially uncontaminated with air exiting that exit port 340*a*. In contrast, for scoops 330*d* and 330*e*, the positioning is offset between and above (relative to weld seam 309) exit ports 340*d*, 340*e* and 340*f*. Despite the variation in angles, shown in FIG. 3, the scoops generally open toward the inboard side, i.e., are inboardly opening.

More generally, for such relative positioning, it is appreciated that in various embodiments the scoops and corresponding entry ports therein are offset from respective paths of local prevailing airflow from downstream-positioned exit ports. This positioning is based on a local prevailing airflow direction along the lateral side of a transition. Some such scoops may be offset positionally along a transition, between and above nearby exit ports, such as is depicted for scoops 330*d* and 330*e* in FIG. 3, when this is consistent with the local prevailing airflow path(s). These scoops 330*d* and 330*e* and their associated entry ports are offset along the axis 305 between the forward end 302 and the aft end 304 of the transition, respectively, from exit ports 340*d*, 340*e*, and 340*f*. Other such scoops may not be so positionally offset yet nonetheless be offset with regard to the local prevailing airflow direction (e.g., 330*a* and 340*a*). It is appreciated that the airflow paths will depend on the particular design of the diffuser and plenum, and may vary within a range based on operating conditions. Accordingly, the position of the scoops in various embodiments is determined based on the airflow paths and cooling requirements at selected high-temperature operating conditions.

Thus, the present invention utilizes pressure distribution within a plenum surrounding a transition in order to provide improved and efficient flow through cooling channels within the walls of a transition. These channels are arranged to take advantage of such pressure differentials.

Figure 4:
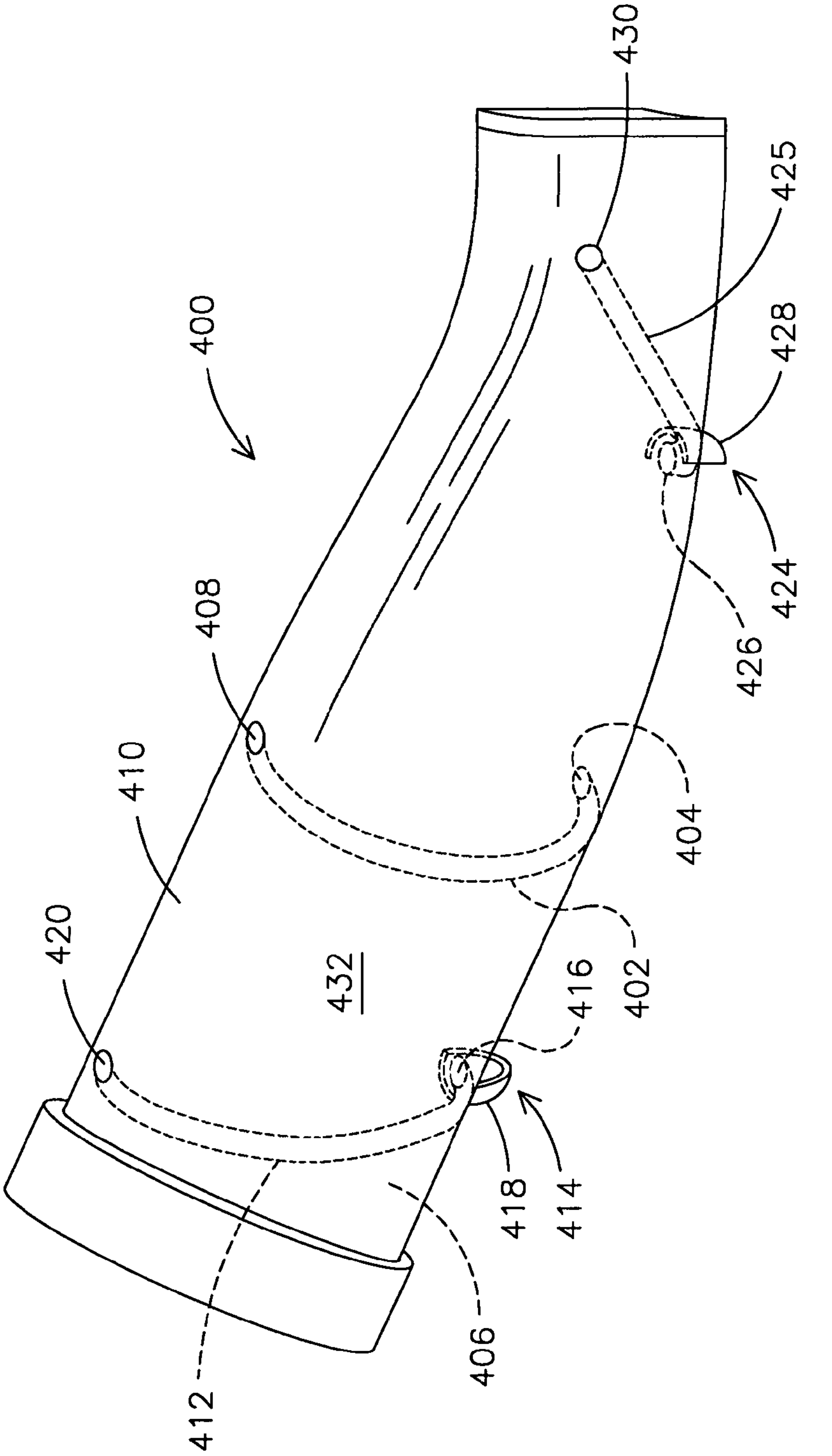
FIG. 4 provides a perspective side view to depict additional, alternative embodiments of cooling channels in a transition.

The examples above are not meant to be limiting as to the relative positions of a particular entry port and a corresponding exit port. For example, a channel in a transition that does not have a weld seam along its lateral sides may have an entry port (with or without a scoop) on the transition inboard side and its corresponding exit port on the outboard side. This is depicted in FIG. 4, which shows within a transition 400 a channel 402 extending from an entry port 404 on inboard side 406 to an exit port 408 on outboard side 410. In FIG. 4 the transition is shown in a perspective side view to enable viewing of the inboard side 406, the outboard side 410, and one lateral side 432. Alternatively, a channel may have its entry port (with or without a scoop) on the lower part of transition lateral side and its corresponding exit port on the upper part of the same lateral side or on the outboard side (for example, between points $P_8$ and $P_7$ of FIG. 3 (in which case the transition would lack a restricting weld seam).

Thus, a scooped opening (i.e., an entry port associated with a deflective member that deflects air into the entry port) on a transition may be associated with a cooling channel not limited to a top half as shown in FIGS. 2A and 2B, nor associated with a corresponding cooling channel system on a bottom half. As a further example, in FIG. 4 a channel 412 extends from a scooped opening 414 (comprising entry port 416 and deflective member 418) on inboard side 406 to an exit port 420 on outboard side 410. Alternatively, for example, in FIG. 4 a channel 425 extends from a scooped opening 424 (comprising entry port 426 and deflective member 428) on inboard side 406 to an exit port 430 on a lateral side 432. A plurality of any one, or combinations of, the channels depicted in FIG. 4 may be provided in a particular transition. Further, it is appreciated that the terms "scoop" and "scooped opening"

herein specifically refer to the scoop designs depicted in the figures, and more generally refer to any deflective member along a transition outer surface having a structure effective to entrap fluid from the prevailing fluid flow so as to increase pressure at the associated entry port, and thereby increase specific fluid flow (e.g., airflow) through a respective cooling channel.

It is further appreciated that the design of a diffuser, as well as of components in the plenum, may affect the overall airflow across different areas (i.e., forward, middle, and aft) of a transition, and also may affect the relative pressure differentials among the inboard, lateral and outboard sides at these different areas. Accordingly, the extent to which the cooling channels as taught herein will be applied to transition areas will depend on the relative pressure differentials and on cost-benefit analyses comparing the cooling channels of the present invention (whether to be provided in an area of favorable, less favorable, or no favorable pressure differentials) with other cooling structures and methods. Part of this analysis should include the benefit to combustion efficiency, and emissions, by not introducing cooling air to the transition interior space where that air may overly cool surfaces that would otherwise advance the combustion of yet-uncombusted fuels and thereby reduce carbon monoxide emissions.

Thus, it is appreciated that other cooling methods, as known in the art, may be combined with the present invention. For example, not to be limiting, the most effective use of the present cooling system may be along a middle section of the transition because this is where the greatest pressure differences may exist between the inboard, lateral and outboard sides. If the channels of the present invention are only provided in such middle section, other cooling approaches would be implemented at the fore end and the aft end of the transition. Such supplemental cooling approaches may be any of those known in the art, including those referred to above.

Also, embodiments of the present invention may include gas turbine engines, such as depicted in FIG. 1A, that comprise a transition comprising cooling channel features as disclosed herein.

The specific embodiment depicted with regard to FIGS. 2A and 2B should not be taken to be limiting of the possible design variations for the present invention. For example, a single entry port may supply one, two or a greater number of cooling channels, for example either directly (i.e., ends of two or more cooling channels disposed at a single entrance or exit port) or by provision of an entry port leading to a manifold in fluid communication with a plurality of cooling channels. Such single entry port may be positioned at an advantageous position along the transition with regard to pressure so as to increase airflow through the cooling channels. For the bottom half cooling channels, such cooling channels ganged to a common entry port may all be on one side of a transition, or may be arranged so that some pass to one side, and others pass to the other side, from a common entry port. Likewise, a single exit port may communicate with one, two or a greater number of cooling channels at the respective exit ends of those channels. A number of exit ends may be disposed directly in an exit port, or, alternatively, may be in fluid communication via a manifold that leads to an exit port advantageously disposed with regard to a favorable pressure profile at a position along the transition. For the top half cooling channels, such cooling channels ganged to a common exit port may all be on one side of a transition, or may be arranged so that some pass along one side, and others pass along the other side, before reaching a common exit port. As needed, multiple channels may deviate from a linear path at their respective entry and exit ends to communicate with such common entry and exit ports. Generally, embodiments comprising one or more such entrance or exit ports, each common to a number of cooling channels, with or without manifolds, may afford airflow advantages in comparison with alternative designs that would provide individual intake or exit ports disposed along regions of a transition that would provide less advantageous pressure differentials between respective intake and exit ports.

Further, and more generally, a transition wall (such as 201, above) may be comprised of components fabricated in various manners, and accordingly may comprise a variety of layers. For example, not to be limiting, U.S. Pat. Nos. 3,652,181, 5,906,093, and 6,602,053, discuss and disclose various types of panel-type structures that may be applied to transitions. Further as to the present invention, a transition wall may be comprised of a single metal sheet into which are formed cooling channels according to the present invention. Alternatively, a transition wall may be comprised of an outer wall structure and an inner wall structure, bonded together, having cooling channels formed between, or having cooling channels formed in one of the outer wall or the inner wall structures prior to bonding together. Other variations are also known and may be applied to embodiments of the present invention. As used herein, a transition wall may be formed by any method known to those skilled in the art, and the cooling channels described and claimed herein may be formed by any method known to those skilled in the art so long as these cooling channels, upon completion of the transition, are within the transition wall, extending between the respective entry and exit ports.

U.S. Pat. No. 6,602,053 is specifically incorporated by reference for its teachings of methods of formation of forming cooling features on a turbine component such as a transition. As to the general teachings of components of transitions, the following references are of interest: U.S. Pat. Nos. 6,463,742; 6,662,568; and U.S. patent application Ser. No. 11/117,051, filed Mar. 28, 2005, and titled Gas Turbine Combustor Barrier Structure for Spring Clips. These and all other patents, patent applications, patent publications, and other publications referenced herein are hereby incorporated by reference in this application in order to more fully describe the state of the art to which the present invention pertains, to provide such teachings as are generally known to those skilled in the art.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

I claim as my invention:

1. A transition for a gas turbine engine, the transition comprising a transition wall having an outer surface and an inner surface and comprising an inboard side, an outboard side, and a first lateral side and a second lateral side connecting the inboard and the outboard sides, the transition wall further comprising:

a. a first entry port through the outer surface along the inboard side communicating with at least one first cooling channel within the transition wall originating at the first entry port and terminating at a first exit port through the outer surface disposed along the first lateral side; and b. a second entry port through the outer surface along the first lateral side, disposed relative to an inboardly opening scoop extending from the first lateral side for entrapment of a portion of air passing over the transition from the inboard side toward the outboard side, the second entry port communicating with at least one second cooling channel originating at the second entry port and extending from the second entry port to a second exit port through the outer surface disposed along the outboard side.

2. The transition of claim 1, additionally comprising at least one additional cooling channel comprising an intake end in fluid communication with the first entry port or the second entry port.

3. The transition of claim 1, additionally comprising at least one additional cooling channel comprising an exit end in fluid communication with the first exit port or the second exit port.

4. The transition of claim 1, additionally comprising:

a. a third entry port through the outer surface, adjacent the first entry port, communicating with at least one third cooling channel within the transition wall originating at the third entry port and terminating at a third exit port through the outer surface disposed along the second lateral side, and b. a fourth entry port through the outer surface along the second lateral side, disposed relative to an inboardly-opening scoop extending from the second lateral side for entrapment of air passing over the transition from the inboard side toward the outboard side, the fourth entry port communicating with at least one fourth cooling channel originating at the fourth entry port and extending from the fourth entry port to a fourth exit port through the outer surface disposed along the outboard side.

5. The transition of claim 4 wherein the transition wall is comprised of a top half and a bottom half joined along two weld seams disposed respectively along the first lateral side and the second lateral side, one of the weld seams separating the first exit port from the second entry port and the other of the weld seams separating the third exit port from the fourth entry port.

6. The transition of claim 5, wherein the second entry port and the fourth entry port are offset, respectively, from respective paths of local airflow exiting the first and third exit ports.

7. A gas turbine engine comprising the transition of claim 1.

8. A gas turbine engine comprising the transition of claim 6.

* * * * *